United States Patent [19]

Peters

[11] 3,828,530

[45] Aug. 13, 1974

[54] FILTER SYSTEM

[76] Inventor: Max D. Peters, 633 Turnpike Rd., Minneapolis, Minn. 55416

[22] Filed: Apr. 27, 1973

[21] Appl. No.: 355,079

Related U.S. Application Data

[63] Continuation-in-part of Ser. No. 176,988, Sept. 1, 1971, abandoned.

[52] U.S. Cl............... 55/473, 55/482, 55/502, 55/504, 55/507, 55/DIG. 18, 55/DIG. 29, 55/DIG. 31

[51] Int. Cl............................................ B01d 31/00

[58] Field of Search........ 55/DIG. 18, DIG. 29, 473, 55/472, 467, 502, 509, 511, 482, DIG. 31, 504, 507; 128/1 R; 98/115 R, 115 K, 115 LH, 40 R, 40 C, 40 N, 36

[56] References Cited
UNITED STATES PATENTS

| | | | |
|---|---|---|---|
| 3,134,637 | 5/1964 | Bashlow................................. | 128/1 |
| 3,229,611 | 1/1966 | Berger, Jr............................. | 98/115 |
| 3,375,640 | 4/1968 | Pelosi, Jr. ............................ | 55/276 |
| 3,470,679 | 10/1969 | Ramsey........................... | 55/DIG. 29 |
| 3,593,502 | 7/1971 | Pelosi, Jr. ......................... | 55/502 X |
| 3,616,624 | 11/1971 | Marsh................................... | 55/472 |

OTHER PUBLICATIONS
"Design Specifications for Table Top Modules," Moore & Hanks Co., 9702 Bush Street, El Monte, California, 91733, received May 1, 1967, 2 pages.

*Primary Examiner*—Dennis E. Talbert, Jr.
*Attorney, Agent, or Firm*—Dugger, Johnson & Westman

[57] ABSTRACT

A filter system suitable for clean benches, or clean rooms, or wall modules that includes a housing that is closed other than for an air intake opening and an air discharge opening, a prefilter mounted in the air intake opening, a high efficiency filter mounted in the discharge opening, a blower mounted in the housing, a plastic duct having one end sealed to the blower outlet and an opposite end sealed to the high efficiency filter for conducting air under pressure from the duct to the high efficiency filter, the duct other than at the discharge opening being spaced from the walls of the housing whereby any air drawn into the housing, and leakage air between the housing interior and the ambient atmosphere, including adjacent the high efficiency filter, is drawn into the blower to be conducted through the high efficiency filter prior to discharge from the housing.

14 Claims, 9 Drawing Figures

PATENTED AUG 13 1974
3,828,530
SHEET 1 OF 3
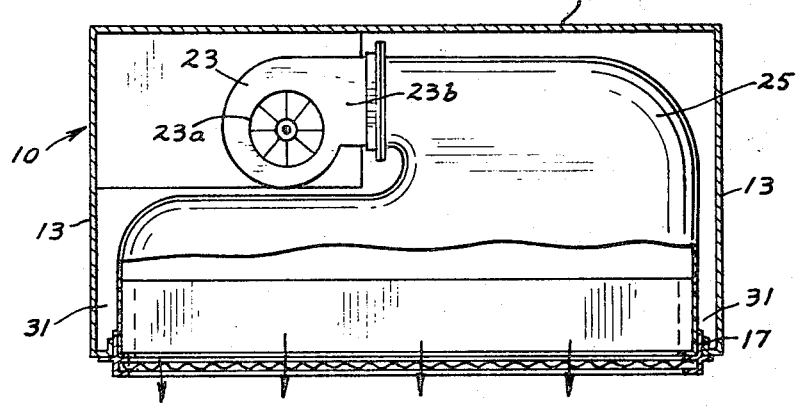
FIG.1
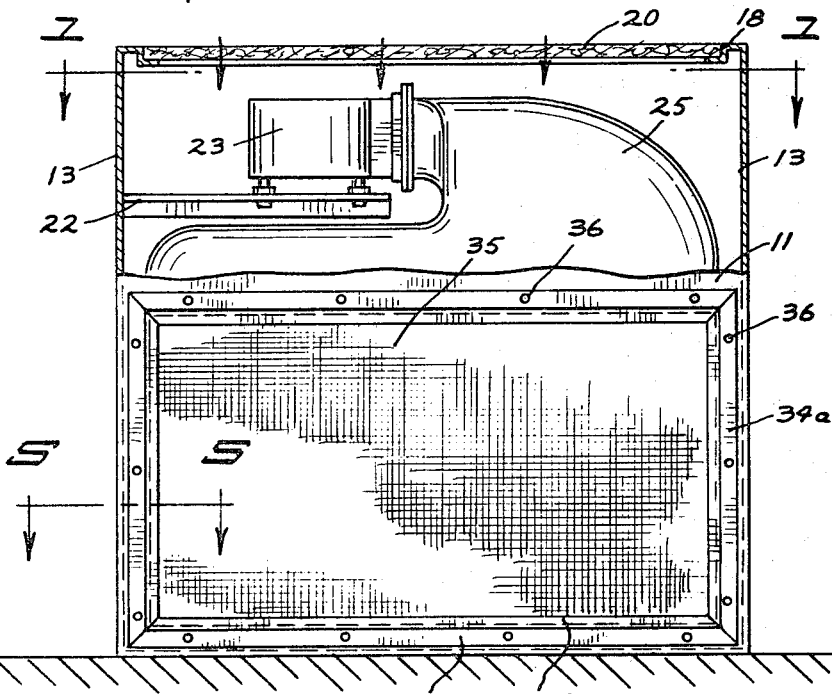
FIG.2
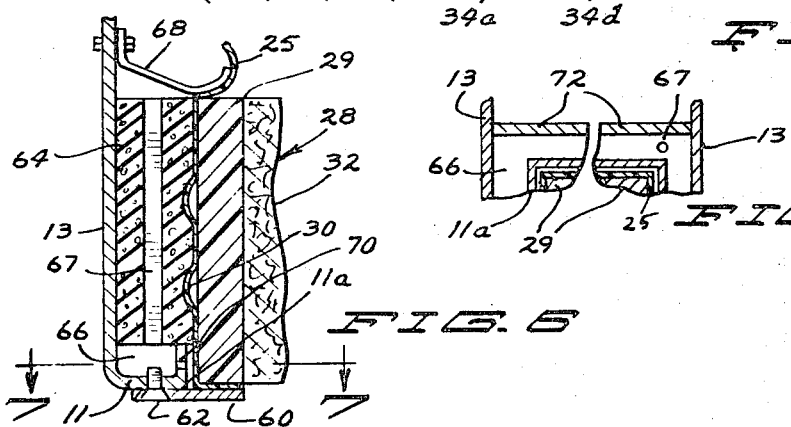
FIG.6
FIG.7

3,828,530

FILTER SYSTEM

CROSS REFERENCE TO RELATED APPLICATIONS

This application is a continuation-in-part application of my application Ser. No. 176,988, filed Sept. 1, 1971 now abandoned.

BACKGROUND OF THE INVENTION

A filter system suitable for clean benches, or clean rooms, or the like that includes a high efficiency filter and a blower for discharging air under pressure through the filter.

In the prior art, for clean benches or clean modules, it is old to clamp a high efficiency filter on a housing against a rigid frame member that in turning compresses a gasket member and thereby form an air supply pressure plenum. Typically air under pressure is supplied by a blower to the housing and air flows out through the high efficiency filter to provide an ultra clean air environment for a clean bench or a clean air zone. A plurality of modules of such prior art systems can constitute a wall or ceiling of a clean room. In such prior art systems which employ a clamping force to effect a seal, the integrity of the seal is dependent upon the resistance of the seal material to resist aging, and to retain resiliency and a fixed relationship between the high efficiency filter and the housing. The cleanliness of the efflux air in front of the high efficiency filter is highly dependent on the seal between the high efficiency filter and the rigid frame against which it is clamped. The seal itself, usually made of an elastomer, can relax, shrink or vitrify and crack, thus permitting air leakage. Typically, stressed metal or wood frames (depending on the structural material), used to hold the clamped high efficiency filter can relax or break and permit unfiltered air from the air supply plenum to flow directly into the clean efflux air from the high efficiency filter. Cement and/or sealants used on the frame and plenum members can vitrify, crack and/or shrink and permit air leakage. All of the foregoing potential leaks exist as a hazard to the ultra clean air environment that is essential to the usual end use of a clean bench or module. In U.S. Pat. No. 3,375,640, to Pelosi, Jr., a filter is located a substantial distance away from the outlet of the housing in which the filter is mounted, but contains no suggestion of a cradle mounting the filter in the housing inlet. In U.S. Pat. No. 3,616,624 to Marsh a blower is mounted in a housing, but the blower inlet is not in air flow communication with the area adjacent and surrounding at least a portion of the high efficiency filter. In U.S. Pat. No. 3,470,679 to Ramsey, the blower inlet is connected by a duct to open exteriorly of the housing and to tubes in the housing, but does not open to the interior of the housing. Further the space between the housing and the filter frame has pressurized, unfiltered air therein. In order to overcome problems of the aforementioned nature as well as others, this invention has been made.

SUMMARY OF THE INVENTION

A filter system for clean benches, or clean rooms, or the like that includes a housing forming a plenum chamber that is enclosed other than for an inlet opening and an air discharge opening, a blower mounted in said housing, a prefilter mounted in the air inlet opening, a high efficiency filter mounted in the discharge opening, and a plastic duct for fluidly conducting air under pressure from the blower to and through the high efficiency filter, the duct being spaced from the walls of the housing and in sealing relationship to the high efficiency filter whereby air leakage between the interior and exterior of the housing is drawn into the housing and into the blower inlet to be subsequently passed through the high efficiency filter.

It is an object of this invention to provide a high efficiency filter air flow system that is independent of the precise relationship between the seals of the various members and that includes an air duct to provide a continuous air flow passage from the air pressure source (usually a blower) to the high efficiency filter. It is a further object of this invention to provide a new and novel filter system wherein the pressure in the air space between a housing and an inner plastic duct is less than the ambient pressure surrounding the housing to virtually eliminate unfiltered air outflow passing into the filtered efflux from the high efficiency filter. It is another object of this invention to provide a new and novel filter system having a high efficiency filter that increases the reliability of always having clean air and is not effected by the housing racking in shipping or moving so that the factory certified air filtration efficiency is maintained throughout the life of the high efficiency filter.

It is an additional object of this invention to provide a high efficiency air filter module for clean benches and the like which is less expensive and of lighter material than that previously used, is of simple construction and permits easy replacement of the high efficiency filter.

BRIEF DESCRIPTION OF THE DRAWINGS

FIG. 1 is a horizontal cross-sectional view of the first embodiment of the filter system of this invention, said view being generally taken along the line and in the direction of the arrows 1—1 of FIG. 2;

FIG. 2 is a front view of the structure of FIG. 1, the upper portion of the front wall and the adjacent portion of the top wall of the housing being broken away;

Figure 5:
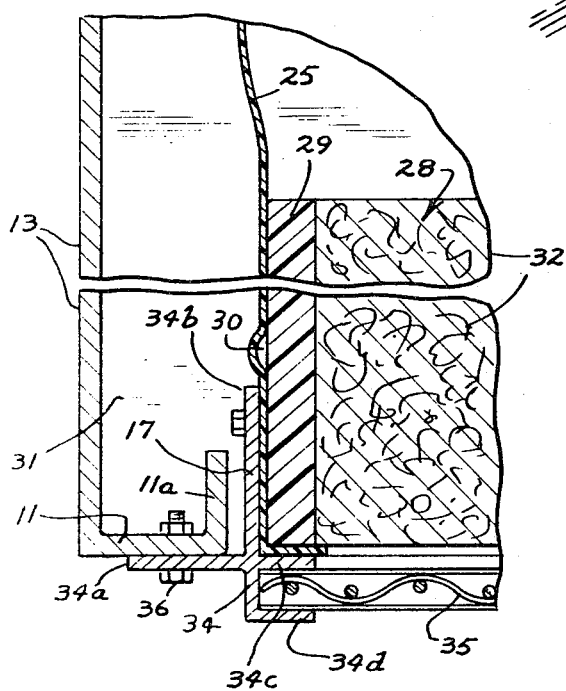
Figure 4:
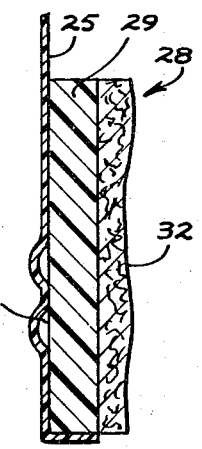

Filter 4 is an enlarged fragmentary cross-sectional view of the first embodiment to more clearly show the sealing of the plastic duct to the high efficiency filter frame;

FIG. 5 is an enlarged fragmentary cross-sectional view generally taken along the line and in the direction of the arrow 5—5 of FIG. 2 to more clearly show the mounting of the high efficiency filter on the housing;

FIG. 6 is a view similar to FIG. 5 other than it is of the second embodiment of the invention;

FIG. 7 is a fragmentary cross-sectional view generally taken on the line and in the direction of the arrows 7—7 of FIG. 6 to show the shelf and the top portion of the filter frame.

Figure 8:
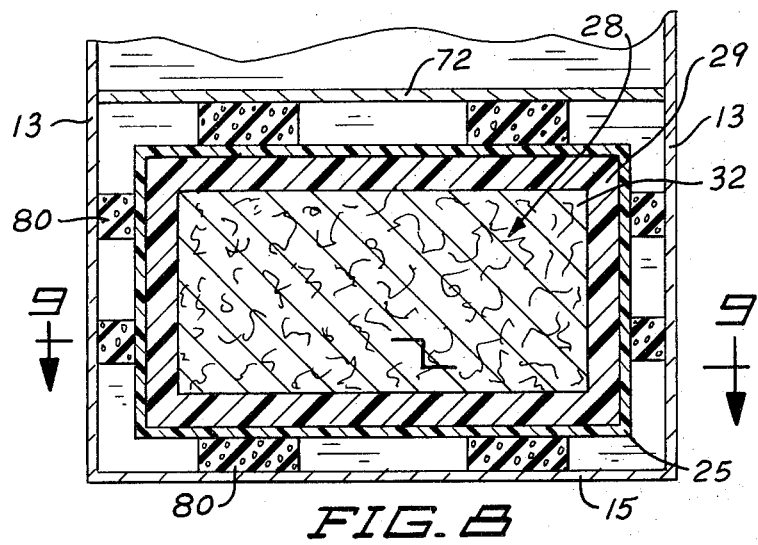
Figure 9:
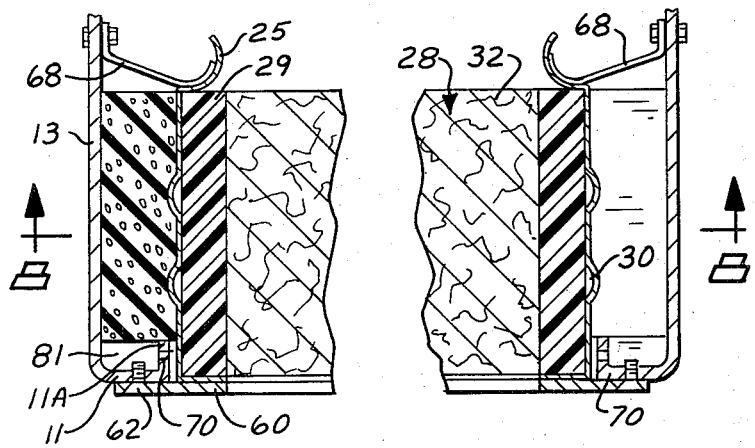

FIG. 8 is a fragmentary vertical cross-sectional view of the third embodiment of the invention to show the mounting of the high efficiency filter on the housing with the thickness of the duct and the filter frame being of exaggerated thickness relative the other structure, said view being generally taken along the line and in the direction of the arrows 8—8 of FIG. 9; and FIG. 9 is a fragmentary horizontal cross-sectional view generally taken along the line and in the direction of the arrows 9—9 of FIG. 8, the central portion being broken away.

Figure 3:
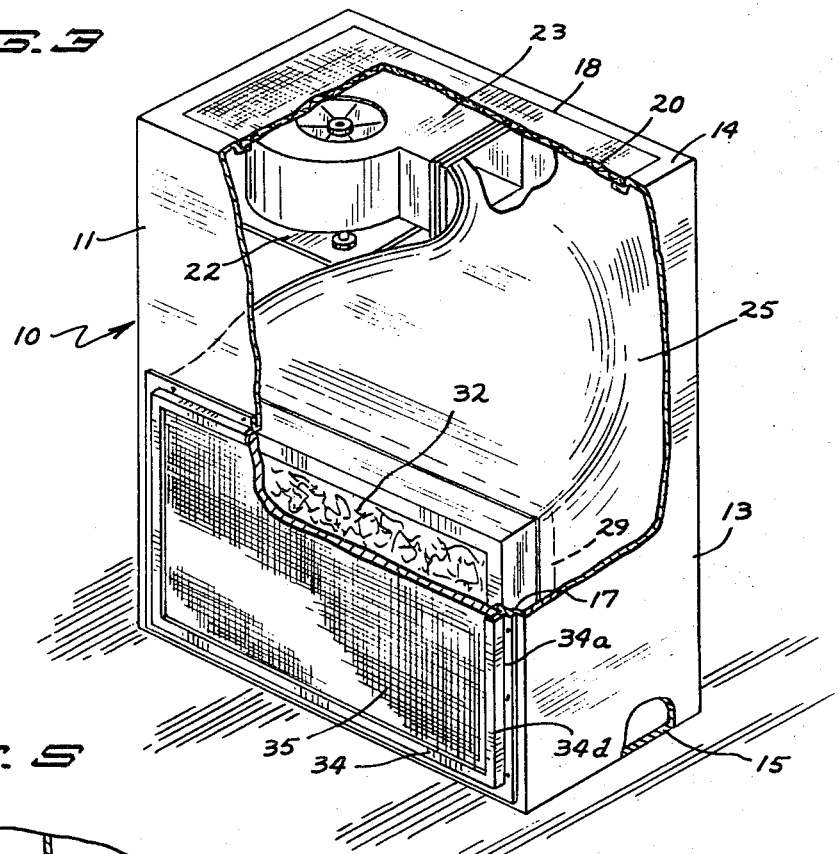
FIG. 3 is a perspective view of the structure of FIG. 1 with portions of the housing, the prefilter and the filter cradle being broken away.

Referring now in particular to FIGS. 1 to 3, the first embodiment includes a housing, generally designated 10, having a front wall 11 with an air discharge opening 17 provided therein, a rear wall 12, side walls 13, a top wall having an air inlet opening 18 and a bottom wall 15 that are joined together to form a closed housing other than for openings 17, 18. It is to be understood that a suitable closeable opening (not shown) may be provided in the housing for access to the interior thereof. Removably mounted by the top wall to close the air inlet opening 18 is a prefilter 20. A suitable mounting member 22 is secured to the housing to be located on the interior thereof, said mounting member mounting a motor driven blower 23 that has a blower air inlet 23a and a blower outlet 23b. A continuous plastic duct 25 has one end portion secured to the blower outlet with a suitable mechanical clamping member and extends away from the blower. The opposite end of the duct encompasses the entire frame 29 of the high efficiency filter, generally designated 28, and is sealed to said frame, preferably permanently, with a suitable sealant 30 such as silicone cement. However, a pumpable mastic cement with non-hardening characteristics will be satisfactory and permit disassembly of the high efficiency filter from the duct in the field.

The filter 28 also includes the filter material 32 which is mounted by frame 29. The filter 28 has at least a 75 percent efficiency for the removal of 0.3 micron particles as determined by the Standard D.O.P. Test of the Army Chemical Corps. and preferably provides 99.9 percent removable of all aersol particulate contaminants, 0.3 microns enlarger, as defined by government specifications TID-7023, High Efficiency Particulate Air Filter Units.

The sealant 30 extends around the entire periphery of the outer surface of the filter frame for securing the plastic duct thereto.

A filter support cradle 34 is provided for securing the high efficiency filter to the housing to be located within the discharge opening 17, the cradle having a central opening through which air passed through the filter material of filter 28 flows outwardly to the ambient atmosphere. The cradle has a leg 34a that is secured to the front wall by suitable means such as screws or bolts 36, a leg 34b that extends into the housing and is suitable fastened to the side surface of the filter frame 29, for example by screws, a leg 34c that extends along the front edge of the filter frame and a right angle leg 34d for mounting a suitable screen or grill 35 that extends across the front face of the filter material for protecting the filter material, the grill being removably mounted in the channel formed by legs 34c, 34d. Desirably the cradle is made of more than one piece with the legs of each piece integrally joined to facilitate changing filters 28. The cradle 34 is made of a flexible material such as metal to permit limited flexibility of movement between the high efficiency filter and the housing so that the housing can distort a limited amount as it is moved in shipping, etc. without passing undue strain onto the high efficiency filter. Further, it is to be mentioned that the leg 34b of the cradle surrounds the forward edge portion of the filter frame while the leg 34a likewise extends around the periphery of the high efficiency filter frame and is suitably secured to the edge portions of the housing front wall that defines the air discharge opening. Not previously mentioned is that the front end portions of the plastic duct extends between the leg 34b and the filter frame 28 while desirably the sealant 30 for securing the plastic duct to the filter frame is located rearwardly on the rearward terminal edge of the leg 34b, whereby screws pass through the leg, the duct and into the filter frame do not break the seal 30 between the duct and filter frame.

The front wall edges which define the discharge opening are spaced sufficiently from the top, bottom and side walls of the housing provide an air space 31 surrounding the entire duct and frame 29 other than for the interfaces between the filter frame and front wall, and the cradle and the filter frame. That is, the spacing of the duct discharge end portion and the side walls and bottom wall respectively is such as indicated by FIG. 5.

The duct is imperforated, made of plastic, preferably heavy gauge and collapsible, and is of progressively increasing cross-sectional area from the blower outlet to the high efficiency filter, and preferably is entirely supported by the blower outlet and the high efficiency filter frame between the blower outlet and the high efficiency filter. Thus, the duct provides a plastic air supply pressure plenum which acts to efficiently convert a velocity pressure from the blower to static pressure ahead of the high efficiency filter by providing a constantly and smoothly increasing cross-sectional flow area.

With the high efficiency filter mounted in place on the housing and connected to the blower by the duct 25, upon turning on the blower, the blower draws air in through the prefilter 21 with a pressure drop caused by the somewhat restrictive filtering action of the prefilter 20 which creates a steady state pressure less than the ambient atmospheric pressure outside of the housing. Thus, the entire space within the housing between the housing walls and the duct 25 is at a lower pressure than the exterior of the housing while the air within the duct is under a higher pressure than that exterior of the housing. As a result, if there is air leakage between the blower outlet and duct, or an air leakage of the ambient atmosphere into the space 31 from between the housing front wall and the cradle, or between the cradle and the portion of the duct secured to the filter frame, such leakage air is drawn into the blower inlet and thus is then passed through the high efficiency filter. Accordingly, any outflow of air from the housing has to pass through the high efficiency filter.

The high efficiency filter and the duct may be sold as a unit with the discharge end of the duct sealed to the high efficiency filter frame; or if desired the duct may be reused and the high efficiency filter replaced. In either event, it is relatively easy to replace the high efficiency filter in that only the cradle 34 has to be removed from the housing, the duct and high efficiency filter disconnected from the cradle, and if only the high efficiency filter is to be replaced, usually it is easier to remove both the duct and the high efficiency filter and then separate the high efficiency filter from the duct.

If both the duct and high efficiency filter are to be removed and/or replaced, then of course, the inlet end of the duct would be disconnected from the blower outlet.

As it may be apparent from the above, due to the slight vacuum in the space 31, any leakage of air coming into the housing is drawn into the blower and then passed through the duct and high efficiency filter rather than having air that has not passed through the high efficiency filter being forced out of the housing into the area that is to be swept by the clean air flow. Thus a filter system of this invention is suitable to be incorporated into a clean bench or a module suitable for use in precision electromechanical assembly, semiconductor manufacturing, drug compounding and the like.

Referring to FIGS. 6 and 7 there is shown modified structure (second embodiment) for retaining the high efficiency filter 28 in the housing 10, the filter 28 and duct 25 being sealed together in the same relationship as described with reference to FIGS. 1–5. However in place of cradle 34 there is provided a cradle 60 that is a rectangular frame with a central opening for air discharge through the filter to pass therethrough. Cradle 60 has a perimetric inner frame portion that overlaps the frame 29 to removably prevent the filter 28 from being moved outwardly from the housing and an outer perimetric frame portion that is removably secured to the housing front wall 11 by screws 62.

A flange 11a is joined to the housing front wall at the discharge opening to extend inwardly, and is spaced slightly from and extends around the top, sides and bottom of the filter frame 28. A resilient pad 64, for example a polyurethane sponge, extends around the filter frame 29, has one peripheral surface abutting against a substantial portion of the duct that overlaps the top, bottom and sides of the filter frame, and an outer peripheral surface that abuts against the housing side walls and bottom wall and is cemented thereto, a front edge portion abutting against the rear edge of flange 11a whereby a generally U-shaped air space 66 is provided between the front wall, the pad and the bottom and side walls. A generally horizontal shelf 72 is mounted by the side and front walls in parallel overhanging relationship to the top member of frame 29 to have the top strip of pad 64 cemented thereto, said top strip also abutting against the portion of the duct overlapping frame 29 in the manner indicated relative the side wall 13, the pad, duct and side member of frame 29 in FIG. 6. The shelf, pad and flange 11a provide a continuation of air space 66 that extends across the top of the filter frame.

One or more bores 67 extend through the pad to open air space 66 and to the air space rearwardly of the pad. A plurality of spring steel positioning clips 68 are mounted by the side and rear walls for abutting against the rear edge of the pad and the duct 25 for resiliently holding the frame 29 with the portion of the duct abutting against the frame front edge against cradle 60, while suitable spring steel clips (not shown) are mounted by the shelf to perform the same function. The pad is of sufficient thickness to form a fluid seal with the portion of the duct extending between the pad and the filter frame. A plurality of bores 70 may be provided in flange 11a to place air space 66 in fluid communication with any air space between the flange 11a and the portion of the duct that extends forwardly of pad 64 so that any leakage air in the last mentioned space is drawn into the blower.

Referring to FIGS. 8 and 9 there is shown further modified structure (third embodiment) for retaining the high efficiency filter 28 in the housing 10, the filter 28 and the duct 25 being sealed together in the same relationship as described with reference to FIGS. 1–5. The third embodiment is of the same construction as that of the second embodiment except there is not provided a single resilient pad 64 that surrounds the filter frame. In place of the single resilient pad 64, there are provided a plurality of spaced resilient pad 80. Two pads that are vertically spaced from each other are provided between each frame side wall 13 and the adjacent side of the filter frame 29. Similarly between the bottom wall 15 and the bottom of the filter frame there are provided a pair of resilient pads 80, and between the shelf 72 and the top of the filter frame there are provided a pair of resilient pads 80. Each of pads extend between and abut against the duct and the housing side and bottom walls and the shelf respectively, and are spaced from the housing front wall 11 to provide an air space 81 that opens to the spacing between the pads 80 whereby the inlet of the blower is in direct air flow communication with the cradle, including that portion directly forwardly of the pads 80. The pads 80 are cemented to the housing and shelf respectively, but not fastened to the duct or filter frame 82. The spring clips 68 which abut against the adjacent parts of the duct resiliently urge the filter frame toward the cradle 60 and retain the filter frame closely adjacent the cradle to substantially block any air flow into the housing between the filter frame and the cradle. Thereby, the filter frame is resiliently retained in a position to hold the front part of the duct in abutting relationship to the cradle. However, the cradle is not attached to the filter frame, the resilient pads 80 aiding in retaining the filter frame in proper alignment with the cradle while permitting limited movement of the filter frame relative the cradle. As previously indicated, any leakage air flowing into the housing between the cradle and housing, and between the cradle and filter frame is drawn into the blower inlet.

In the second and third embodiments, the resilient pad and pads respectively serve to hold the filter in place so that cabinet racking in shipment or moving does not effect the integrity of the air filtration efficiency of the system.

What is claimed is:

1. Clean air apparatus suitable for clean benches, clean rooms, and the like comprising a housing having an outlet, a high efficiency air filter having at least a 75 percent efficiency for the removal of 0.3 micron particles as determined by the standard D.O.P. Test of the Army Chemical Corps. and having an air inlet surface and an air discharge surface, first means for mounting the high efficiency filter on the housing in the housing outlet with the filter inlet surface within the housing, a conduit within the housing and having an inlet end portion and a discharge end portion sealed to the filter to provide air under pressure at the filter inlet surface, said filter having a filter frame and said first means comprising a filter cradle of somewhat flexible material that surrounds the filter frame in abutting relationship thereto, said cradle being secured to the housing and being made of metal that is resilient, a grill mounted by the cradle exterior of the housing to protect the discharge surface of the filter, and second means for providing a source of air under pressure and a vacuum within the housing in the space between said housing and the conduit and the portion of the filter extending within the housing, said second means having a discharge end portion fluidly connected to the conduit inlet end portion for discharging air under pressure into the conduit, and said conduit and the filter portion within the housing being spaced from the housing to provide a surrounding air space.

2. Clean air apparatus suitable for clean benches, clean rooms, and the like comprising a housing having front, top, bottom and side walls joined together, said front wall having a discharge outlet substantially spaced from the other walls, a high efficiency air filter having at least a 75 percent efficiency for the removal of 0.3 micron particles as determined by the standard D.O.P. Test of the Army Chemical Corps. and having a filter frame, an air inlet surface and an air discharge surface, first means for mounting the high efficiency filter on the housing in the housing outlet with the filter inlet surface within the housing, a conduit within the housing and having an inlet end portion and a discharge end portion sealed to the filter to provide air under pressure at the filter inlet surface, said first means comprising a filter cradle of somewhat flexible material that surrounds the filter frame and is secured thereto and secured to the housing, said cradle extending through the discharge outlet into the housing interior in surrounding relationship to the filter frame, and second means for providing a source of air under pressure and a vacuum within the housing in the space between said housing and the conduit and the portion of the filter extending within the housing, said second means having a discharge end portion fluidly connected to the conduit inlet end portion for discharging air under pressure into the conduit, said conduit and the filter portion within the housing being spaced from the housing to provide a surrounding air space, said second means comprising a powered blower that has an air inlet within the housing and has said second means discharge end portion, said blower inlet being in direct air flow communication with the cradle to draw any leakage air adjacent the cradle into the second means.

3. Clean air apparatus suitable for clean benches, clean rooms, and the like comprising a housing having front, top, bottom and side walls joined together, said front wall having a discharge outlet substantially spaced from the other walls, a high efficiency air filter having at least a 75 percent efficiency for the removal of 0.3 micron particles as determined by the standard D.O.P. Test of the Army Chemical Corps. and having a filter frame that has a front edge, an air inlet surface and an air discharge surface, first means for mounting the high efficiency filter on the housing in the housing outlet with the filter inlet surface within the housing, a conduit within the housing and having an inlet end portion and a discharge end portion sealed to the filter to provide air under pressure at the filter inlet surface, said first means comprising a filter cradle of somewhat flexible material that surrounds the filter frame and is secured to the housing, said cradle overlapping the front edge of the filter frame, third means for releasably retaining the filter frame closely adjacent the cradle, second means for providing a source of air under pressure and a vacuum within the housing in the space between said housing and the conduit and the portion of the filter extending within the housing, said third means having a discharge end portion fluidly connected to the conduit inlet end portion for discharging air under pressure into the conduit, said conduit and the filter portion within the housing being spaced from the housing to provide a surrounding air space, and a resilient pad surrounding at least a part of the filter frame, abutting against the duct and housing, spaced from the front wall to provide a second air space between the filter frame and side and bottom walls and having a bore fluidly connecting the second air space to the air space rearwardly of the pad whereby any air leakage into the second space is drawn into the third means.

4. Clean air apparatus suitable for clean benches, clean rooms, and the like comprising a housing having front, top, bottom and side walls joined together, said front wall having a discharge outlet substantially spaced from the other walls, a high efficiency air filter having at least a 75 percent efficiency for the removal of 0.3 micron particles as determined by the standard D.O.P. Test of the Army Chemical Corps. and having a filter frame, an air inlet surface and an air discharge surface, first means for mounting the high efficiency filter on the housing in the housing outlet with the filter inlet surface within the housing, a conduit within the housing and having an inlet end portion and a discharge end portion sealed to the filter to provide air under pressure at the filter inlet surface, said first means comprising a filter cradle that surrounds the filter frame, second means for removably securing the cradle to the housing with the cradle closely adjacent the discharge outlet, third means for providing a source of air under pressure and a vacuum within the housing in the space between said housing and the conduit and the portion of the filter extending within the housing, said third means having a discharge end portion fluidly connected to the conduit inlet end portion for discharging air under pressure into the conduit, said conduit and the filter portion within the housing being spaced from the housing to provide a surrounding air space, said third means comprising a powered blower that has an inlet within the housing and has said third means discharge end portion, said blower inlet being in direct air flow communication with the cradle to draw any leakage air adjacent the cradle into the second means, and fourth means for releasably retaining the filter frame closely adjacent the cradle.

5. The apparatus of claim 4 further characterized in that said conduit is of an increasing cross-sectional area from the blower to the filter.

6. The apparatus of claim 4 further characterized in that the filter frame has a front edge, that the cradle overlaps the filter frame front edge, and that the conduit extends between the filter front edge and the cradle.

7. The apparatus of claim 4 further characterized in that the cradle extends through the discharge outlet into the housing interior in surrounding relationship to the filter frame and is secured to the filter frame.

8. The apparatus of claim 4 further characterized in that the first means includes a resilient pad surrounding the filter frame, abutting against the duct and housing and spaced from the front wall to provide an air space between the filter frame and side and bottom walls, the resilient pad being secured to the housing and having a bore therethrough for placing the blower inlet in direct air flow communication with the cradle.

9. The apparatus of claim 4 further characterized in that the first means includes a plurality of resilient pads abutting against the housing and the duct between the filter frame and the housing, and spaced from the front wall and cradle, said pads being secured to the housing and spaced from one another to provide openings for providing direct air flow communication between the blower inlet and the cradle.

10. The apparatus of claim 4 further characterized in that the first means includes resilient pads means abutting against the housing side walls and bottom wall between the housing and the filter frame, and that the fourth means comprises spring means for resiliently urging the filter frame toward the cradle and retaining it adjacent thereto, the filter frame being movable relative the cradle and having a front edge, the cradle overlapping the filter frame front edge.

11. Clean air apparatus suitable for clean benches, clean rooms, and the like comprising a housing having front, top, bottom and side walls joined together, said front wall having a discharge outlet substantially spaced from the other walls, a high efficiency air filter having at least a 75 percent efficiency for the removal of 0.3 micron particles as determined by the standard D.O.P. Test of the Army Chemical Corps. and having a filter frame that has a front edge, an air inlet surface and an air discharge surface, first means for mounting the high efficiency filter on the housing in the housing outlet with the filter inlet surface within the housing, a conduit within the housing and having an inlet end portion and a discharge end portion sealed to the filter to provide air under pressure at the filter inlet surface, said first means comprising a filter cradle of somewhat flexible material that surrounds the filter frame and is secured to the housing, said cradle overlapping the front edge of the filter frame, third means for releasably retaining the filter frame closely adjacent the cradle, second means for providing a source of air under pressure and a vacuum within the housing in the space between said housing and the conduit and the portion of the filter extending within the housing, said third means having a discharge end portion fluidly connected to the conduit inlet end portion for discharging air under pressure into the conduit, said conduit and the filter portion within the housing being spaced from the housing to provide a surrounding air space, and resilient pad means abutting against the duct and housing and spaced from the front wall to provide a second air space between the filter frame and side and bottom walls, said pad means providing an opening fluidly connecting the second air space to the air space rearwardly of the pad means whereby any air leakage into the second space is drawn into the second means.

12. The apparatus of claim 11 further characterized in that the first means includes means mounted in the housing for abutting against the duct to exert a force against the filter frame to resiliently retain the filter frame closely adjacent the cradle and urging the filter frame toward the cradle.

13. The apparatus of claim 11 further characterized in that the pad means comprises a resilient pad surrounding at least a part of the filter frame, the last mentioned opening comprising a pad bore extending through the pad.

14. The apparatus of claim 11 further characterized in that said pad means comprises a plurality of pads spaced around the periphery of the filter frame, each of the pads being spaced from the front wall, and an adjacent pair of pads being spaced to provide the last mentioned opening.

* * * * *